(12) United States Patent
Pourcheresse et al.

(10) Patent No.: US 10,960,757 B2
(45) Date of Patent: Mar. 30, 2021

(54) SINGLE POINT FILLING FOR AN INDEPENDENT REFRIGERATION UNIT DRIVEN BY A SEPARATE ENGINE

(71) Applicant: CARRIER CORPORATION, Palm Beach Gardens, FL (US)

(72) Inventors: Lionel Pourcheresse, Le Mesnil Esnard (FR); Andrew Stumpf, Bonsecours (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 305 days.

(21) Appl. No.: 16/302,804

(22) PCT Filed: May 30, 2016

(86) PCT No.: PCT/IB2016/000965
§ 371 (c)(1),
(2) Date: Nov. 19, 2018

(87) PCT Pub. No.: WO2017/208044
PCT Pub. Date: Dec. 7, 2017

(65) Prior Publication Data
US 2019/0299739 A1    Oct. 3, 2019

(51) Int. Cl.
*B60H 1/00* (2006.01)
*B60K 15/04* (2006.01)
(Continued)

(52) U.S. Cl.
CPC ......... *B60K 15/04* (2013.01); *B60H 1/00364* (2013.01); *B60H 1/3232* (2013.01);
(Continued)

(58) Field of Classification Search
CPC .......... B60K 2015/03131; B60K 15/04; B60K 2015/0458; B60K 15/063; B60K 2015/03118
See application file for complete search history.

(56) References Cited

U.S. PATENT DOCUMENTS 4,852,892 A    8/1989 Reid
6,283,142 B1   9/2001 Wheeler et al.
(Continued)

FOREIGN PATENT DOCUMENTS

DE    102009049687 A1    4/2011
DE    202013102467 U1    6/2013
(Continued)

OTHER PUBLICATIONS

International Search Report for International Application No. PCT/IB2016/000965, dated Mar. 1, 2017 (7 pp.).
(Continued)

*Primary Examiner* — Brian L Swenson
(74) *Attorney, Agent, or Firm* — Cantor Colburn LLP

(57) ABSTRACT

A transport refrigeration system having: a refrigerated cargo space (119); a refrigeration unit (22) in operative association with the refrigerated cargo space, the refrigeration unit providing conditioned air to the refrigerated cargo space; a first engine (150) configured to power the vehicle; a second engine (26) configured to power the refrigeration unit; a first plurality of fuel tanks (350) fluidly connected to first engine, the first plurality of fuel tanks configured to supply fuel to the first engine; a second plurality of fuel tanks (330) fluidly connected to second engine, the second plurality of fuel tanks configured to supply fuel to the second engine; and a single filling point (310) fluidly connected to the first plurality of fuel tanks and second plurality of fuel tanks. The single filling point (310) is configured to receive fuel.

20 Claims, 4 Drawing Sheets

(51) Int. Cl.
*B60H 1/32* (2006.01)
*B60K 15/07* (2006.01)
*B60P 3/20* (2006.01)
*F02D 33/00* (2006.01)
*B60K 15/063* (2006.01)
*B60K 15/03* (2006.01)

(52) U.S. Cl.
CPC ............ *B60K 15/063* (2013.01); *B60K 15/07* (2013.01); *B60P 3/20* (2013.01); *F02D 33/003* (2013.01); *B60K 2015/03019* (2013.01); *B60K 2015/03026* (2013.01); *B60K 2015/03118* (2013.01); *B60K 2015/03131* (2013.01); *B60K 2015/03296* (2013.01); *B60K 2015/03302* (2013.01); *B60K 2015/03375* (2013.01); *B60K 2015/03381* (2013.01); *B60K 2015/0474* (2013.01); *B60K 2015/0636* (2013.01); *B60Y 2200/14* (2013.01); *B60Y 2306/01* (2013.01)

(56) References Cited

U.S. PATENT DOCUMENTS

| | | | |
|---|---|---|---|
| 6,371,153 B1 | 4/2002 | Fischerkeller et al. | |
| 6,508,265 B1 | 1/2003 | Bertouille et al. | |
| 7,021,341 B2 | 4/2006 | Viegas et al. | |
| 7,543,667 B2 | 6/2009 | Hwang et al. | |
| 7,624,753 B2 | 12/2009 | Suess et al. | |
| 8,011,383 B2 | 9/2011 | Mowatt et al. | |
| 8,534,403 B2 | 9/2013 | Pursifull | |
| 8,690,190 B2 | 4/2014 | Spitz et al. | |
| 8,807,256 B2 | 8/2014 | Gibb et al. | |
| 9,080,726 B2 | 7/2015 | Lindtner et al. | |
| 9,114,930 B2 | 8/2015 | Simmons | |
| 9,186,958 B2 | 11/2015 | Lurken et al. | |
| 9,428,047 B2 | 8/2016 | Green | |
| 9,499,047 B2 | 11/2016 | Milton et al. | |
| 9,592,731 B2 | 3/2017 | Hanlin et al. | |
| 9,618,158 B2 | 4/2017 | Killeen et al. | |
| 9,682,618 B2 | 6/2017 | Baik et al. | |
| 2008/0110514 A1 | 5/2008 | Yoshida | |
| 2010/0230001 A1* | 9/2010 | Elwart | B60K 15/03 141/35 |
| 2011/0126566 A1* | 6/2011 | Jones | F25B 5/02 62/239 |
| 2013/0055728 A1* | 3/2013 | Lurken | F17C 9/00 62/7 |
| 2015/0112506 A1* | 4/2015 | Hanlin | F02M 21/023 701/1 |
| 2018/0180001 A1* | 6/2018 | Kamikozawa | F02M 25/089 |
| 2019/0047408 A1* | 2/2019 | Villaire | B60K 15/061 |

FOREIGN PATENT DOCUMENTS

| | | |
|---|---|---|
| DE | 102014215719 A1 | 2/2016 |
| EP | 0970323 B1 | 12/2004 |
| JP | 2012112487 A | 6/2012 |
| JP | 2016081724 A | 5/2016 |
| WO | 2015033194 A1 | 3/2015 |

OTHER PUBLICATIONS

Written Opinion of the International Searching Authority for International Application No. PCT/IB2016/000965 dated Mar. 1, 2017 (8 pp.).

\* cited by examiner

SINGLE POINT FILLING FOR AN INDEPENDENT REFRIGERATION UNIT DRIVEN BY A SEPARATE ENGINE

BACKGROUND OF THE DISCLOSURE

The embodiments herein generally relate to transport refrigeration systems and more specifically, the fuel systems of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transport refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

An "all electric" transport refrigeration system for a refrigerated trailer application is also commercially available through Carrier Corporation. In the all electric transport refrigeration system, a prime mover carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

The prime mover typically is an engine carried on and considered part of the transport refrigeration unit, while the vehicle includes a separate engine to power the vehicle. Commonly, the engine of the vehicle and the engine of the transport refrigeration unit have separate fuel lines and separate filling points. Filling the engine of the vehicle and engine of the transport refrigeration unit with the same fuel at multiple filling points is a waste of valuable time and thus, a more efficient solution is desired.

BRIEF DESCRIPTION OF THE DISCLOSURE

According to one embodiment, a transport refrigeration system is provided. The transport refrigeration system having a vehicle having: a refrigerated cargo space; a refrigeration unit in operative association with the refrigerated cargo space, the refrigeration unit providing conditioned air to the refrigerated cargo space; a first engine configured to power the vehicle; a second engine configured to power the refrigeration unit; a first plurality of fuel tanks fluidly connected to the first engine, the first plurality of fuel tanks configured to supply fuel to the first engine; a second plurality of fuel tanks fluidly connected to the second engine, the second plurality of fuel tanks configured to supply fuel to the second engine; and a single filling point fluidly connected to the first plurality of fuel tanks and the second plurality of fuel tanks. The single filling point is configured to receive fuel.

In addition to one or more of the features described above, or as an alternative, further embodiments of the transport refrigeration system may include that the single filling point is configured to distribute the fuel received to the first plurality of fuel tanks and the second plurality of fuel tanks.

In addition to one or more of the features described above, or as an alternative, further embodiments of the transport refrigeration system may include that the single filling point is fluidly connected to each of the first plurality of fuel tanks through a tank connection device. The tank connection device having: a pressure regulator fluidly connected to one of the first plurality of fuel tanks; a manual valve fluidly connected to the pressure regulator; a check valve fluidly connected to the manual valve and the single filling point; and a solenoid valve fluidly connected to the manual valve and the single filling point, the solenoid valve fluidly connected in parallel to the check valve.

In addition to one or more of the features described above, or as an alternative, further embodiments of the transport refrigeration system may include that the single filling point is fluidly connected to each of the second plurality of fuel tanks through a tank connection device. The tank connection device having: a pressure regulator fluidly connected to one of the second plurality of fuel tanks; a manual valve fluidly connected to the pressure regulator; a check valve fluidly connected to the manual valve and the single filling point; and a solenoid valve fluidly connected to the manual valve and the single filling point, the solenoid valve fluidly connected in parallel to the check valve.

In addition to one or more of the features described above, or as an alternative, further embodiments of the transport refrigeration system may include that the single filling point is fluidly connected to each of the second plurality of fuel tanks through a tank connection device. The tank connection device having: a pressure regulator fluidly connected to one of the second plurality of fuel tanks; a manual valve fluidly connected to the pressure regulator; a check valve fluidly connected to the manual valve and the single filling point; and a solenoid valve fluidly connected to the manual valve and the single filling point, the solenoid valve fluidly connected in parallel to the check valve.

In addition to one or more of the features described above, or as an alternative, further embodiments of the transport refrigeration system may include a first shock detector located proximate the first engine. The first shock detector configured to detect a shock proximate the first engine. The first shock detector stops fuel flow from the first plurality of fuel tanks to the first engine when a shock is detected.

In addition to one or more of the features described above, or as an alternative, further embodiments of the transport refrigeration system may include a second shock detector located proximate the second engine. The second shock detector configured to detect a shock proximate the second engine. The second shock detector stops fuel flow from the second plurality of fuel tanks to the second engine when a shock is detected.

In addition to one or more of the features described above, or as an alternative, further embodiments of the transport refrigeration system may include a second shock detector located proximate the second engine. The second shock detector configured to detect a shock proximate the second engine. The second shock detector stops fuel flow from the second plurality of fuel tanks to the second engine when a shock is detected In addition to one or more of the features described above, or as an alternative, further embodiments of the transport refrigeration system may include a controller configured to stop the fuel flow from the second plurality of fuel tanks to the second engine when at least one of a broken fuel supply line and an engine stall is detected.

In addition to one or more of the features described above, or as an alternative, further embodiments of the transport refrigeration system may include a controller configured to stop the fuel flow from the second plurality of fuel tanks to the second engine when at least one of a broken fuel supply line and an engine stall is detected.

In addition to one or more of the features described above, or as an alternative, further embodiments of the transport refrigeration system may include that the fuel is at least one of compressed natural gas and liquefied natural gas.

According to one embodiment, a method of operating a transport refrigeration system is provided the method includes: powering a vehicle using a first engine, the vehicle having a refrigerated cargo space; powering a refrigeration unit using a second engine, the refrigeration unit in operative association with the refrigerated cargo space and provides conditioned air to the refrigerated cargo space; storing fuel for the first engine in a first plurality of fuel tanks, the first plurality of fuel tanks fluidly connected to the first engine; storing fuel for the second engine in a second plurality of fuel tanks, the second plurality of fuel tanks fluidly connected to the second engine; and filling the first plurality of fuel tanks and the second plurality of fuel tanks through a single filling point, the single filling point fluidly connected to the first plurality of fuel tanks and the second plurality of fuel tanks.

In addition to one or more of the features described above, or as an alternative, further embodiments of the method of operating a transport refrigeration system may include that the single filling point is fluidly connected to each of the first plurality of fuel tanks through a tank connection device. The tank connection device having: a pressure regulator fluidly connected to one of the first plurality of fuel tanks; a manual valve fluidly connected to the pressure regulator; a check valve fluidly connected to the manual valve and the single filling point; and a solenoid valve fluidly connected to the manual valve and the single filling point, the solenoid valve fluidly connected in parallel to the check valve.

In addition to one or more of the features described above, or as an alternative, further embodiments of the method of operating a transport refrigeration system may include that the single filling point is fluidly connected to each of the second plurality of fuel tanks through a tank connection device. The tank connection device having: a pressure regulator fluidly connected to one of the second plurality of fuel tanks; a manual valve fluidly connected to the pressure regulator; a check valve fluidly connected to the manual valve and the single filling point; and a solenoid valve fluidly connected to the manual valve and the single filling point, the solenoid valve fluidly connected in parallel to the check valve.

In addition to one or more of the features described above, or as an alternative, further embodiments of the method of operating a transport refrigeration system may include that the single filling point is fluidly connected to each of the second plurality of fuel tanks through a tank connection device. The tank connection device having: a pressure regulator fluidly connected to one of the second plurality of fuel tanks; a manual valve fluidly connected to the pressure regulator; a check valve fluidly connected to the manual valve and the single filling point; and a solenoid valve fluidly connected to the manual valve and the single filling point, the solenoid valve fluidly connected in parallel to the check valve.

In addition to one or more of the features described above, or as an alternative, further embodiments of the method of operating a transport refrigeration system may include: detecting, using a first shock detector, a shock to the first engine, the shock detector being located proximate the first engine; and stopping fuel flow from the first plurality of fuel tanks to the first engine when a shock is detected.

In addition to one or more of the features described above, or as an alternative, further embodiments of the method of operating a transport refrigeration system may include: detecting, using a second shock detector, a shock to the second engine, the shock detector being located proximate the second engine; and stopping fuel flow from the second plurality of fuel tanks to the second engine when a shock is detected.

In addition to one or more of the features described above, or as an alternative, further embodiments of the method of operating a transport refrigeration system may include: detecting, using a second shock detector, a shock to the second engine, the shock detector being located proximate the second engine; and stopping fuel flow from the second plurality of fuel tanks to the second engine when a shock is detected.

In addition to one or more of the features described above, or as an alternative, further embodiments of the method of operating a transport refrigeration system may include: detecting, using a controller, at least one of a broken fuel supply line and an engine stall; and stopping fuel flow from the second plurality of fuel tanks to the second engine when at least one of a broken fuel supply line and an engine stall is detected.

In addition to one or more of the features described above, or as an alternative, further embodiments of the method of operating a transport refrigeration system may include: detecting, using a controller, at least one of a broken fuel supply line and an engine stall; and stopping fuel flow from the second plurality of fuel tanks to the second engine when at least one of a broken fuel supply line and an engine stall is detected.

In addition to one or more of the features described above, or as an alternative, further embodiments of the method of operating a transport refrigeration system may include that the fuel is at least one of compressed natural gas and liquefied natural gas.

Technical effects of embodiments of the present disclosure include filling the fuel tanks of a refrigeration unit engine and the fuel tanks of vehicle engine at a single filling point.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
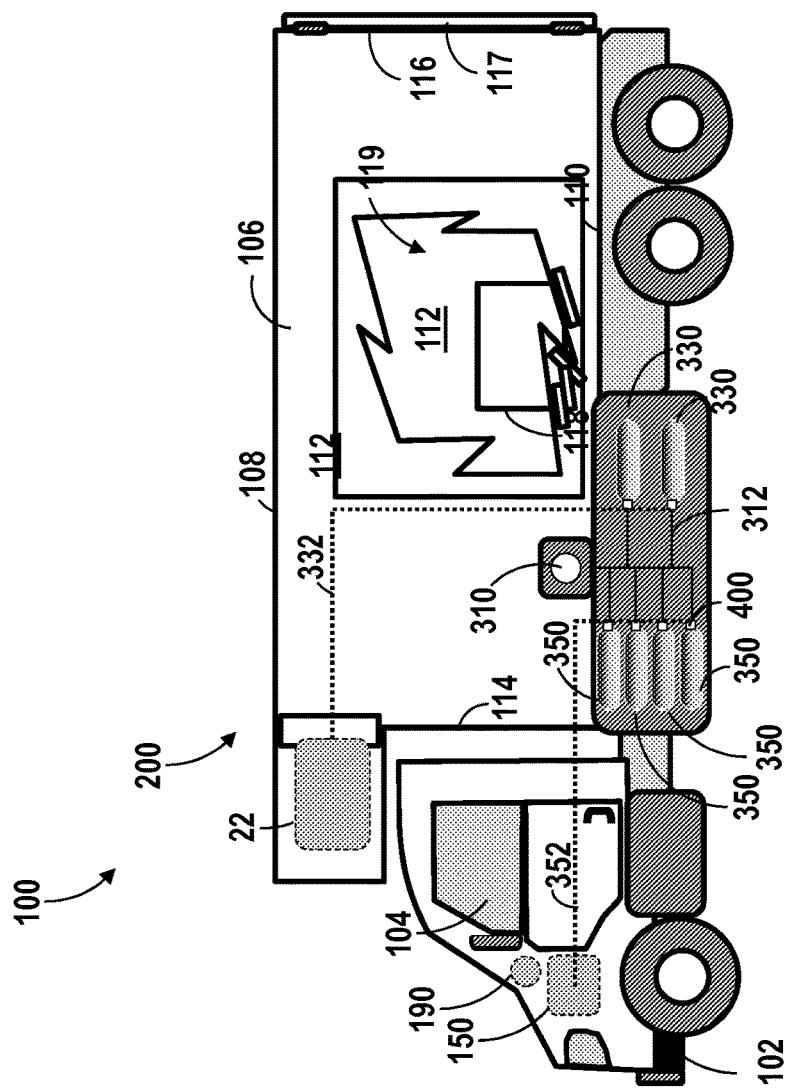
FIG. 1 is a schematic illustration of a transport refrigeration system having a single filling point, according to an embodiment of the present disclosure.
Figure 2:
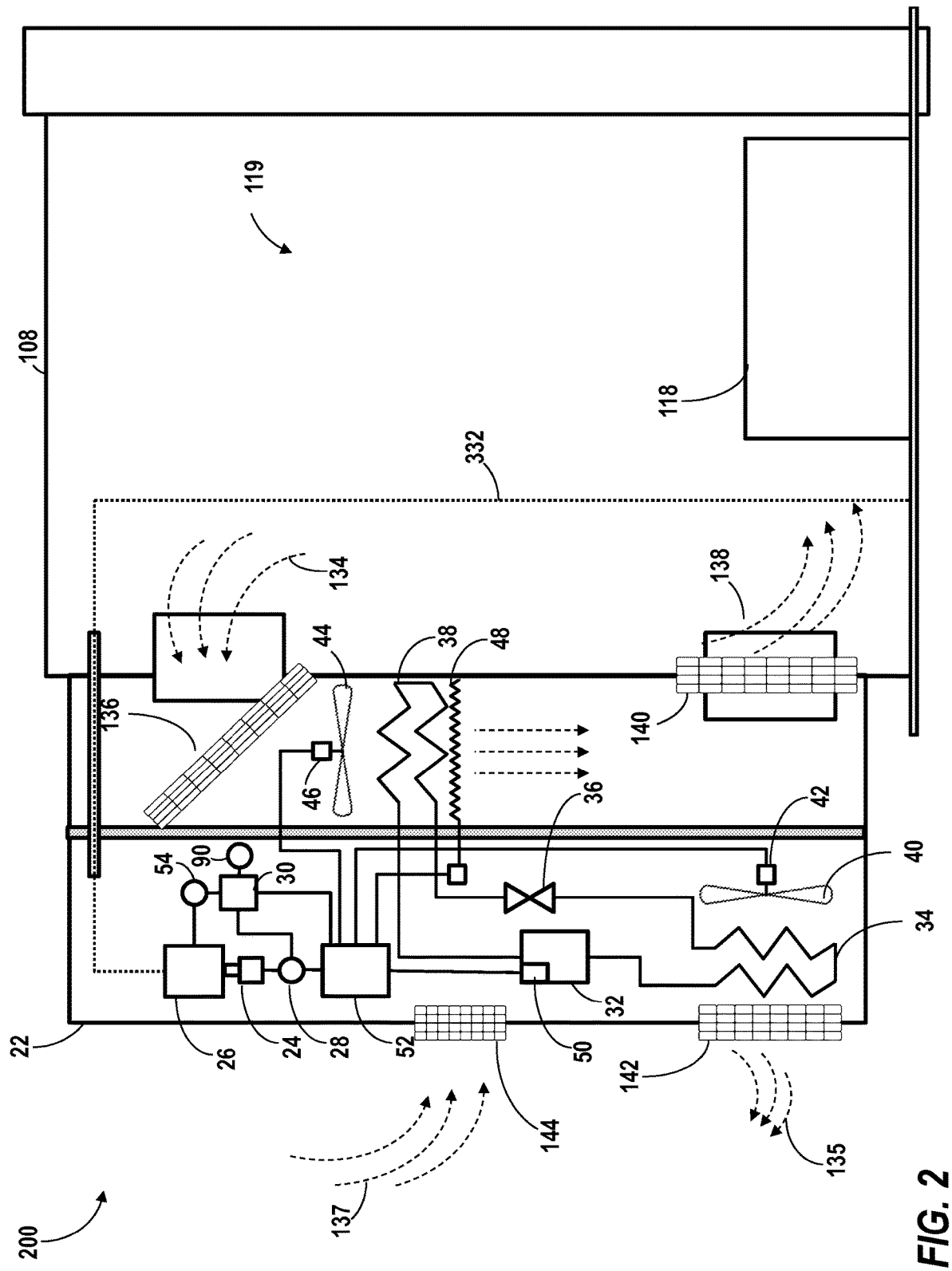
FIG. 2 is an enlarged schematic illustration of the transport refrigeration system of FIG. 1, according to an embodiment of the present disclosure.
Figure 3:
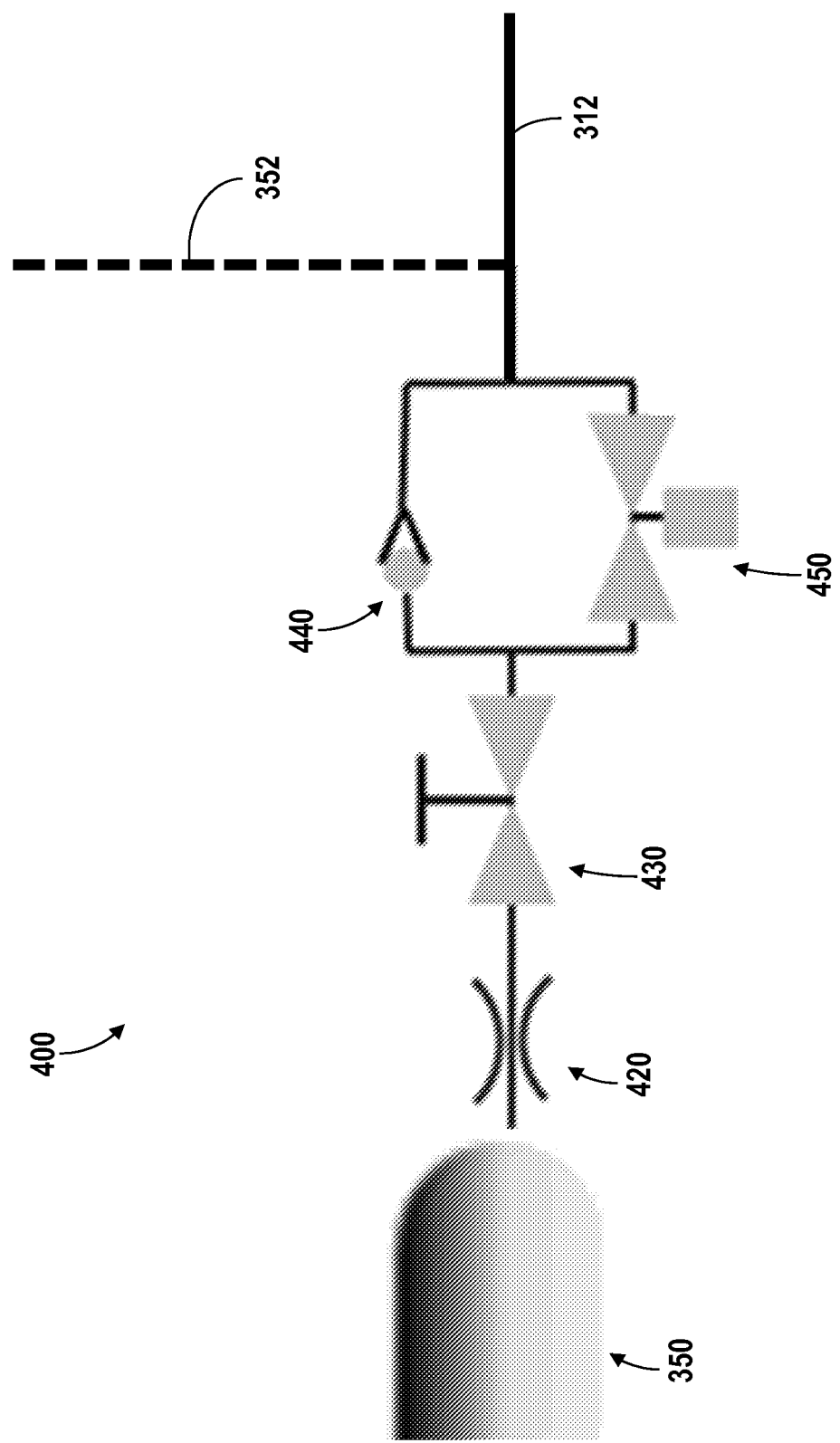
FIG. 3 is a schematic illustration of a tank connection device connected to one of a first plurality of fuel tanks providing fuel to an engine of a vehicle, according to an embodiment of the present disclosure.
Figure 4:
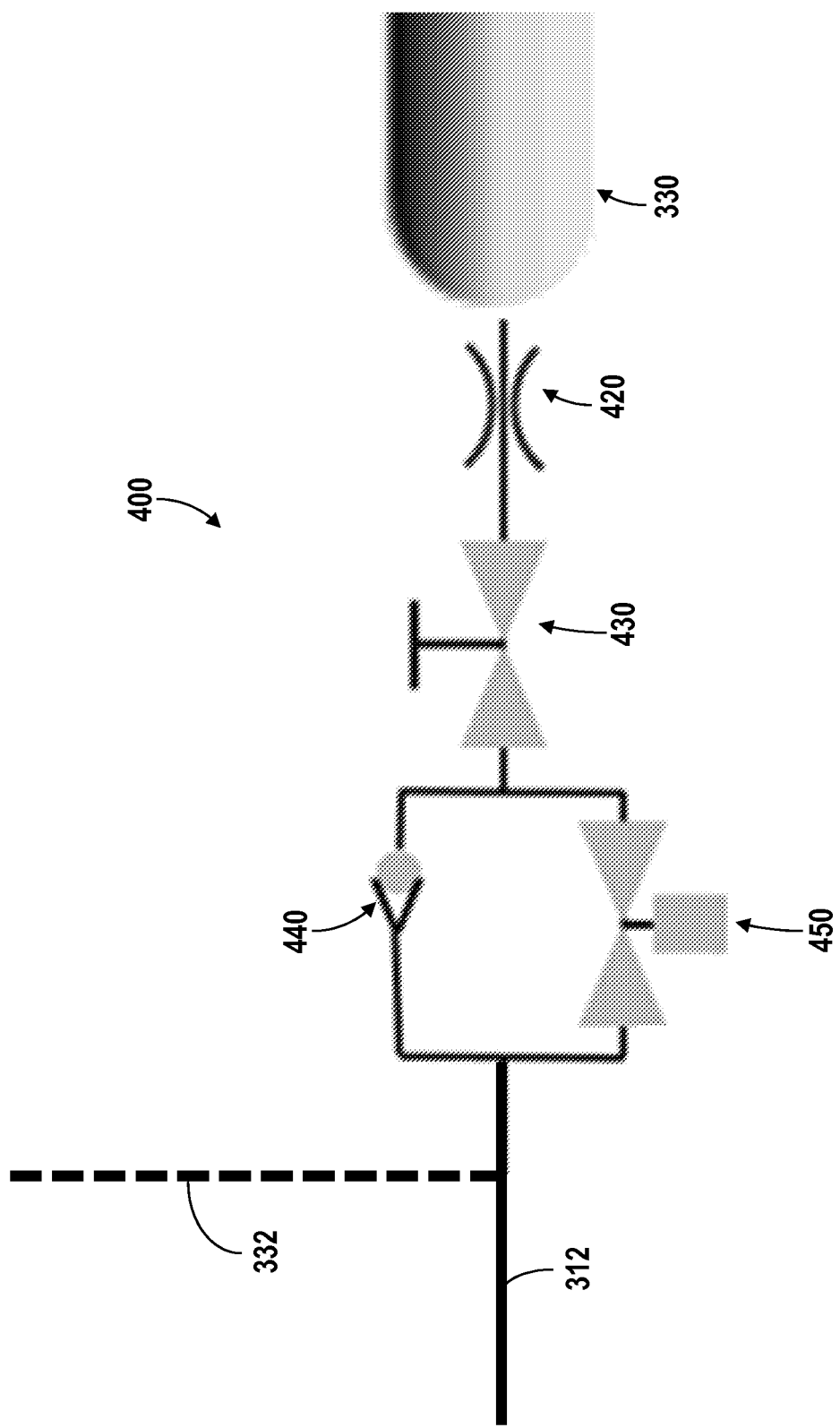
FIG. 4 is a schematic illustration of a tank connection device connected to one of a second plurality of fuel tanks providing fuel to a prime mover of a refrigeration unit, according to an embodiment of the present disclosure.

Referring to FIGS. 1-4. FIG. 1 shows a schematic illustration of a transport refrigeration system 200 having a single filling point 310, according to an embodiment of the present disclosure. FIG. 2 shows an enlarged schematic illustration of the transport refrigeration system 200 of FIG. 1, according to an embodiment of the present disclosure. FIG. 3 shows a schematic illustration of a tank connection device 400 connected to one of a first plurality of fuel tanks 350 providing fuel to the first engine 150 of a vehicle 102, according to an embodiment of the present disclosure. FIG. 4 shows a schematic illustration of a tank connection device 400 connected to one of a second plurality of fuel tanks 330 providing fuel to a prime mover or second engine 26 of a refrigeration unit 22, according to an embodiment of the present disclosure. The transport refrigeration system 200 is being illustrated as a trailer system 100 as seen in FIG. 1. The trailer system 100 includes a vehicle 102 and a transport container 106. The vehicle 102 includes an operator's compartment or cab 104 and a first engine 150 which acts as the drive system of the trailer system 100. The fuel that powers the first engine 150 may be at least one of compressed natural gas and liquefied natural gas. In an embodiment, the fuel is compressed natural gas. In the illustrated embodiment, the fuel to power the first engine 150 of the vehicle 102 is stored in a first plurality of fuel tanks 350. The first plurality of fuel tanks 350 are fluidly connected to the first engine 150 through an engine fuel line 352. The first plurality of fuel tanks 350 is configured to supply fuel to the first engine 150 through the engine fuel line 352. The transport container 106 is coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to non-trailer refrigeration such as, for example a rigid truck or a truck having refrigerate compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a refrigeration unit 22, an electric generation device 24, a second engine 26 for driving the electric generation device 24, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 also includes a controller 30 configured for controlling operation of the transport refrigeration system 200 including, but not limited to, operation of various components of the refrigerant unit 22 to provide and maintain a desired thermal environment within the refrigerated cargo space 119. The controller 30 may also be able to selectively operate the second engine 26, typically through an electronic engine controller 54 operatively associated with the second engine 26. The controller 30 may be an electronic controller including a processor and an associated memory comprising computer-executable instructions that, when executed by the processor, cause the processor to perform various operations. The a processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The second engine 26 is an on-board fossil-fuel engine that drives the electric generation device 24, which generates electrical power. The fuel that powers the prime mover 24 may be at least one of compressed natural gas and liquefied natural gas. In an embodiment, the fuel is compressed natural gas. In another embodiment, the fuel that powers the prime mover 24 is the same fuel that powers the first engine 150 of the vehicle 102. In the illustrated embodiment, the fuel to power the second engine 26 is stored in a second plurality of fuel tanks 330. The second plurality of fuel tanks 330 are fluidly connected to the second engine 26 through a prime mover fuel line 332. The second plurality of fuel tanks 330 is configured to supply fuel to the second engine 26 through the prime mover fuel line 332.

The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Airflow is circulated into and through the refrigerate cargo space 119 of the transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140, which in some embodiments is located near the bottom wall 110 of the container system 106. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 cools the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

In the illustrated embodiment, the transport refrigeration system 200 includes a single filling point 310. The single filling point 310 is fluidly connected to the first plurality of fuel tanks 350 and the second plurality of fuel tanks 330 through a filling line 312. The single filling point 310 is configured to receive fuel from a filling station, such as for example a gas station. When the single filling point 310 receives fuel, the single filling point 310 distributes the fuel received to the first plurality of fuel tanks 350 and the second plurality of fuel tanks 330. Advantageously, a single filling point offers both convenience and simplicity that will help refrigeration system operators save time and money. Also advantageously, having a single filling point but maintaining separate fuel lines to the engine and the prime mover of the refrigeration unit, allows the refrigeration unit to maintain operation even when the engine of the vehicle is turned off.

Each of the fuel tanks of the first plurality of fuel tanks 350 and the second plurality of fuel tanks 330 include a tank connection device 400, as seen in FIG. 1. The tank connection device 400 fluidly connects each tank to single filling point 310 through the filling line 312, as shown in FIG. 1. As shown in FIG. 3, the tank connection device 400 comprises: a pressure regulator 420 fluidly connected to one of the fuel tanks (fuel tank 350 or fuel tank 330); a manual valve 430 fluidly connected to the pressure regulator 420; a check valve 440 fluidly connected to the manual valve 430 and the single refilling point 310; and a solenoid valve 450 fluidly connected to the manual valve 430 and the single refilling point 310, the solenoid valve 450 fluidly connected in parallel to the check valve 440. The check valve 440 and the solenoid valve 450 are connected to the single refilling point 310 through the filling line 312. Further, in regard to the first plurality of fuel tanks 350, the check valve 440 and the solenoid valve 450 are connected to the first engine 150 through the engine fuel line 352, as seen in FIG. 3. Also, in regard to the second plurality of fuel tanks 330, the check valve 440 and the solenoid valve 450 are connected to the second engine 26 through the prime mover fuel line 332, as seen in FIG. 4. Advantageously, a tank connection device prevents the fuel tanks from being over filled and also allows the fuel to be consumed as commanded.

Further, in the illustrated embodiment, the transport refrigeration system 200 includes a refrigeration unit shock detector 90, as seen in FIG. 2. The refrigeration unit shock detector 90 is located proximate the second engine 26 and also operatively connected to the controller 30. The refrigeration unit shock detector 90 detects a shock to the refrigeration unit 22 and/or the second engine 26. When a shock is detected, the refrigeration unit shock detector 90 stops the fuel flow from the second plurality of fuel tanks 330 to the second engine 26. The fuel flow may be stopped by the controller 30, after the refrigeration unit shock detector 90 detects a shock and sends an alert to the controller 30. The refrigeration system 200 also includes an engine shock detector 190, as seen in FIG. 1. The engine shock detector 190 is located proximate the first engine 150. The engine shock detector 190 detects a shock to the vehicle 102 and/or the first engine 150. When a shock is detected, the engine shock detector 190 stops the fuel flow from the first plurality of fuel tanks 350 to the first engine 150. Advantageously, having two separate shock detectors offers added safety in the event of an accident. Also advantageously, having a dedicated shock detector for a prime mover of a refrigeration unit will ensure that fuel flow to the prime mover will cease in the event of a shock to the system, even when the vehicle is turned off. Further, the controller 30 may be configured to stop the fuel flow from the second plurality of fuel tanks 330 to the second engine 26 when at least one of a broken fuel supply line and an engine stall is detected. Additionally, the first engine 150 may contain a second controller (not shown) configured to stop the fuel flow from the first plurality of fuel tanks 350 to the first engine 150 when at least one of a broken fuel supply line and an engine stall is detected.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A transport refrigeration system comprising:
   a vehicle having a refrigerated cargo space;
   a refrigeration unit in operative association with the refrigerated cargo space, the refrigeration unit providing conditioned air to the refrigerated cargo space;
   a first engine configured to power the vehicle;
   a second engine configured to power the refrigeration unit;
   a first plurality of fuel tanks fluidly connected to the first engine, the first plurality of fuel tanks configured to supply fuel to the first engine;
   a second plurality of fuel tanks fluidly connected to the second engine, the second plurality of fuel tanks configured to supply fuel to the second engine; and
   a single filling point fluidly connected to the first plurality of fuel tanks and the second plurality of fuel tanks; and
   wherein the single filling point is configured to receive fuel.

2. The transport refrigeration system of claim 1, wherein:
   the single filling point is configured to distribute the fuel received to the first plurality of fuel tanks and the second plurality of fuel tanks.

3. The transport refrigeration system of claim 1, wherein:
   the single filling point is fluidly connected to each of the first plurality of fuel tanks through a tank connection device, the tank connection device comprising:
   a pressure regulator fluidly connected to one of the first plurality of fuel tanks;
   a manual valve fluidly connected to the pressure regulator;
   a check valve fluidly connected to the manual valve and the single filling point; and
   a solenoid valve fluidly connected to the manual valve and the single filling point, the solenoid valve fluidly connected in parallel to the check valve.

4. The transport refrigeration system of claim 3, wherein:
   the single filling point is fluidly connected to each of the second plurality of fuel tanks through a tank connection device, the tank connection device comprising:
   a pressure regulator fluidly connected to one of the second plurality of fuel tanks;
   a manual valve fluidly connected to the pressure regulator;
   a check valve fluidly connected to the manual valve and the single filling point; and
   a solenoid valve fluidly connected to the manual valve and the single filling point, the solenoid valve fluidly connected in parallel to the check valve.

5. The transport refrigeration system of claim 1, wherein:
   the single filling point is fluidly connected to each of the second plurality of fuel tanks through a tank connection device, the tank connection device comprising:

a pressure regulator fluidly connected to one of the second plurality of fuel tanks;
a manual valve fluidly connected to the pressure regulator;
a check valve fluidly connected to the manual valve and the single filling point; and
a solenoid valve fluidly connected to the manual valve and the single filling point, the solenoid valve fluidly connected in parallel to the check valve.

6. The transport refrigeration system of claim 1, further comprising:
a first shock detector located proximate the first engine, the first shock detector configured to detect a shock proximate the first engine, wherein the first shock detector stops fuel flow from the first plurality of fuel tanks to the first engine when a shock is detected.

7. The transport refrigeration system of claim 6, further comprising:
a second shock detector located proximate the second engine, the second shock detector configured to detect a shock proximate the second engine, wherein the second shock detector stops fuel flow from the second plurality of fuel tanks to the second engine when a shock is detected.

8. The transport refrigeration system of claim 6, further comprising:
a controller configured to stop the fuel flow from the second plurality of fuel tanks to the second engine when at least one of a broken fuel supply line and an engine stall is detected.

9. The transport refrigeration system of claim 6, wherein:
the fuel is at least one of compressed natural gas and liquefied natural gas.

10. The transport refrigeration system of claim 1, further comprising: a shock detector located proximate the second engine, the shock detector configured to detect a shock proximate the second engine, wherein the shock detector stops fuel flow from the second plurality of fuel tanks to the second engine when a shock is detected.

11. The transport refrigeration system of claim 1, further comprising:
a controller configured to stop the fuel flow from the second plurality of fuel tanks to the second engine when at least one of a broken fuel supply line and an engine stall is detected.

12. A method of operating a transport refrigeration system, the method comprising:
powering a vehicle using a first engine, the vehicle having a refrigerated cargo space;
powering a refrigeration unit using a second engine, the refrigeration unit in operative association with the refrigerated cargo space and provides conditioned air to the refrigerated cargo space;
storing fuel for the first engine in a first plurality of fuel tanks, the first plurality of fuel tanks fluidly connected to the first engine;
storing fuel for the second engine in a second plurality of fuel tanks, the second plurality of fuel tanks fluidly connected to the second engine; and
filling the first plurality of fuel tanks and the second plurality of fuel tanks through a single filling point, the single filling point fluidly connected to the first plurality of fuel tanks and the second plurality of fuel tanks.

13. The method of claim 12, wherein:
the single filling point is fluidly connected to each of the first plurality of fuel tanks through a tank connection device, the tank connection device comprising:
a pressure regulator fluidly connected to one of the first plurality of fuel tanks;
a manual valve fluidly connected to the pressure regulator;
a check valve fluidly connected to the manual valve and the single filling point; and
a solenoid valve fluidly connected to the manual valve and the single filling point, the solenoid valve fluidly connected in parallel to the check valve.

14. The method of claim 13, wherein:
the single filling point is fluidly connected to each of the second plurality of fuel tanks through a tank connection device, the tank connection device comprising:
a pressure regulator fluidly connected to one of the second plurality of fuel tanks;
a manual valve fluidly connected to the pressure regulator;
a check valve fluidly connected to the manual valve and the single filling point; and
a solenoid valve fluidly connected to the manual valve and the single filling point, the solenoid valve fluidly connected in parallel to the check valve.

15. The method of claim 12, wherein:
the single filling point is fluidly connected to each of the second plurality of fuel tanks through a tank connection device, the tank connection device comprising:
a pressure regulator fluidly connected to one of the second plurality of fuel tanks;
a manual valve fluidly connected to the pressure regulator;
a check valve fluidly connected to the manual valve and the single filling point; and
a solenoid valve fluidly connected to the manual valve and the single filling point, the solenoid valve fluidly connected in parallel to the check valve.

16. The method of claim 12, further comprising:
detecting, using a first shock detector, a shock to the first engine, the shock detector being located proximate the first engine; and
stopping fuel flow from the first plurality of fuel tanks to the first engine when a shock is detected.

17. The method of claim 16, further comprising:
detecting, using a second shock detector, a shock to the second engine, the shock detector being located proximate the second engine; and
stopping fuel flow from the second plurality of fuel tanks to the second engine when a shock is detected.

18. The method of claim 16, further comprising:
detecting, using a controller, at least one of a broken fuel supply line and an engine stall; and
stopping fuel flow from the second plurality of fuel tanks to the second engine when at least one of a broken fuel supply line and an engine stall is detected.

19. The method of claim 12, further comprising: detecting, using a shock detector, a shock to the second engine, the shock detector being located proximate the second engine; and stopping fuel flow from the second plurality of fuel tanks to the second engine when a shock is detected.

20. The method of claim 12, further comprising:
detecting, using a controller, at least one of a broken fuel supply line and an engine stall; and
stopping fuel flow from the second plurality of fuel tanks to the second engine when at least one of a broken fuel supply line and an engine stall is detected.

* * * * *